United States Patent
Völcker et al.

(10) Patent No.: US 12,445,636 B2
(45) Date of Patent: Oct. 14, 2025

(54) METHOD AND DEVICE FOR SIGNING AN ENCODED VIDEO SEQUENCE

(71) Applicant: Axis AB, Lund (SE)

(72) Inventors: Björn Völcker, Lund (SE); Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 421 days.

(21) Appl. No.: 17/980,138

(22) Filed: Nov. 3, 2022

(65) Prior Publication Data

US 2023/0179787 A1    Jun. 8, 2023

(30) Foreign Application Priority Data

Dec. 3, 2021 (EP) .................................. 21212291

(51) Int. Cl.
| | | |
|---|---|---|
| H04N 19/46 | (2014.01) | |
| H04N 19/159 | (2014.01) | |
| H04N 19/169 | (2014.01) | |
| H04N 19/172 | (2014.01) | |
| H04N 19/177 | (2014.01) | |

(52) U.S. Cl.
CPC ........... *H04N 19/46* (2014.11); *H04N 19/159* (2014.11); *H04N 19/172* (2014.11); *H04N 19/177* (2014.11); *H04N 19/188* (2014.11)

(58) Field of Classification Search
None
See application file for complete search history.

(56) References Cited

U.S. PATENT DOCUMENTS

| | | | | |
|---|---|---|---|---|
| 8,694,789 | B2 * | 4/2014 | Chapman | ............... G06F 21/645 |
| | | | | 380/278 |
| 9,473,829 | B2 | 10/2016 | Lefebvre et al. | |
| 2002/0178368 | A1 * | 11/2002 | Yin | .................... H04N 1/32299 |
| | | | | 713/186 |

(Continued)

FOREIGN PATENT DOCUMENTS

| | | |
|---|---|---|
| CN | 109543432 A | 3/2019 |
| CN | 110401818 A | 11/2019 |

(Continued)

OTHER PUBLICATIONS

Extended European Search Report dated May 17, 2022 for European Patent Application No. 21212291.5.

(Continued)

*Primary Examiner* — Younes Naji
(74) *Attorney, Agent, or Firm* — Volpe Koenig

(57) ABSTRACT

A device and a method of signing an encoded video sequence comprising: obtaining an encoded video sequence composed of encoded image frames; generating a set of one of more frame fingerprints for each encoded image frame; generating a document comprising a header of a supplemental information unit, and a representation of the generated sets of one or more frame fingerprints; generating a document signature by digitally signing the document; generating the supplemental information unit to only consist of the document, the document signature and an indication of an end of the supplemental information unit; and signing the encoded video sequence by associating the generated supplemental information unit with the encoded video sequence.

15 Claims, 5 Drawing Sheets

(56) References Cited

U.S. PATENT DOCUMENTS

| | | | |
|---|---|---|---|
| 2008/0291999 A1* | 11/2008 | Lerouge | H04N 21/23895 |
| | | | 348/E7.056 |
| 2010/0118191 A1* | 5/2010 | Chevallier | H04N 21/8456 |
| | | | 348/E7.024 |
| 2011/0078459 A1 | 3/2011 | Yoshioka et al. | |
| 2014/0010366 A1 | 1/2014 | Quinn et al. | |
| 2020/0084022 A1* | 3/2020 | Winarski | G06F 21/602 |
| 2021/0337158 A1* | 10/2021 | Keskikangas | H04N 23/69 |
| 2021/0409840 A1* | 12/2021 | Young | H04N 21/235 |
| 2023/0239508 A1* | 7/2023 | Boyce | G06T 9/005 |
| | | | 375/240.12 |

FOREIGN PATENT DOCUMENTS

| | | | | |
|---|---|---|---|---|
| CN | 110427762 A | | 11/2019 | |
| ES | 2624916 A1 | * | 7/2017 | G06Q 50/01 |
| WO | 2008/125601 A1 | | 10/2008 | |
| WO | 2021/183645 A1 | | 9/2021 | |

OTHER PUBLICATIONS

Harran et al., "A Method for Verifying Integrity & Authenticating Digital Media," Applied Computing and Informatics, vol. 14, Issue 2, pp. 145-158, (2018).

Schneier, "Applied Cryptography: Protocols, Algorithms, and Source Code in C," 2nd Edition, pp. 34-41 (Oct. 18, 1996).

* cited by examiner

METHOD AND DEVICE FOR SIGNING AN ENCODED VIDEO SEQUENCE

FIELD OF INVENTION

The present disclosure relates to the field of security arrangements for protecting video sequences against unauthorised activity. In particular, it proposes methods and devices for signing an encoded video sequence.

TECHNICAL BACKGROUND

A video sequence is an ordered sequence of video frames, and a video frame is made up of pixels. If a common scene is being imaged, the consecutive video frames will be strongly correlated. The ability to predict one video frame given past frames is an underlying assumption of prediction-based encoding. Prediction-based encoding may be described as a data compression technique specifically adapted for video sequences.

A video frame used as a reference for predicting other frames is called a reference frame. Frames encoded without information from other frames are referred to as intra-coded frames, intra-frames, I-frames or key frames. Frames that use prediction from one or more reference frames are referred to as intra-coded frames or inter-frames. A P-frame is an inter-frame that uses prediction from a single preceding reference frame (or a single frame for prediction of each region) and a B-frame is an inter-frame that uses prediction from two reference frames, one preceding and one succeeding. A frame is sometimes referred to as a picture. Recommendation ITU-T H.264 (August 2021) "Advanced video coding for generic audiovisual services", International Telecommunication Union, specifies a video coding standard in which both forward-predicted and bidirectionally predicted frames are used.

FIG. 1 illustrates a segment of a prediction-based encoded video sequence composed of I-frames and P-frames. As mentioned above, an I-frame is a data structure with independently decodable image data, which can be decoded into a decoded video frame (or a decoded part of a video frame) by means of a predefined associated decoding operation. A P-frame, for its part, is a data structure whose associated decoding operation makes reference not only to the image data of the P-frame itself but also to at least one other I- or P-frame. Conceptually, and somewhat simplified, the image data in a P-frame expresses the change or movement relative to the video frame that its preceding I- or P-frame encodes. If the decoding operations are successful, video frames decoded from P-frames and I-frames are in general indistinguishable.

The inter-frame dependencies are indicated in FIG. 1 as arc-shaped arrows oriented in the negative time direction, t. In the depicted simple example, each P-frame refers to the immediately preceding I- or P-frame. If the first P-frame refers to a second P-frame, the second P-frame necessarily refers to at least one further I- or P-frame. In the present disclosure, the first P-frame will be said to refer directly to the second P-frame and to refer indirectly to the at least one further I- or P-frame. Because the image data in an I-frame is independently decodable, the chain of references (arc-shaped arrows) does not continue past an I-frame. The combination of an I-frame and the subsequent P-frames which refer to the I-frame directly or indirectly can be referred to as a group of pictures, which in some encoding formats are referred to as GOPs. Four GOPs are indicated in FIG. 1: IPP, IPPPP, IPPP, IPPP.

Digital signatures provide a layer of validation and security to digital messages that are transmitted through a non-secure channel. By means of the digital signature, a recipient of the digital message can validate the authenticity or integrity of the message. It goes without saying that video data, e.g., a video sequence, as a special case, can be digitally signed to provide a layer of validation and security to the video data. The video data may be signed by signing a fingerprint of the video data rather than the video data itself. The use of frame-wise fingerprints $H_I$, $H_P$ is illustrated in the lower part of FIG. 1, where each fingerprint may be a hash of that video frame's image data or a hash of that video frame's image in combination with optional further information. Signatures S1, S2, S3, S4 for the GOPs are obtained by digitally signing a combination of the fingerprints in that GOP. The security of the video sequence may further be protected from unauthorized replacement, removal or insertion of full GOPs if the I-frame fingerprints $H_I$ are signed both as part of its own GOP and as part of the preceding GOP's signature, as illustrated in FIG. 1. It is noted that straight downward arrows in the upper row represent the hash function, and the arrows in the lower row represent digital signing.

However, even if the video sequence is digitally signed as described above, the video sequence may still be exposed to fraudulent manipulation as data may be added to the video, e.g., before the first GOP in the video sequence. Further, if the I-frame fingerprints $H_I$ are not signed both as part of its own GOP and as part of the preceding GOP's signature, one or more GOPs may be deleted, added or replaced with a risk of such manipulation not being detected. US 2008/0291999 A1 discloses a method and apparatus for marking individual video frames of an H.264/AVC standard compliant or equivalent digital video stream. Each video frame in a H.264/AVC video stream is conventionally divided into NAL units. There are typically a number of NAL units for each video frame. A Supplemental Enhancement Information (SEI) type is specified in the H.264/AVC standard. The SEI type includes the user data unregistered type, which can contain arbitrary data. In the disclosed method and apparatus, an NAL unit of this type is provided at the beginning of each video frame, preceding the other NAL units associated with that video frame. This is schematically illustrated in FIG. 2. The payload data contained in the special SEI unit, sometimes referred to as SEI data, is typically control information for downstream control of use of the video content. Examples of SEI data are stream positioning data such as a video frame number; stream bit rate, such as normal, fast forward; decryption data, such as a decryption key or key derivation seed; and validation elements, such as a checksum or hash function value or signature. Thus, the SEI data may comprise decryption data, such as the decryption key or the key derivation seed, needed for decrypting encrypted video frames. Further, the SEI data may comprise validation data, such as the checksum or hash function value or signature, needed for validating signed video frames.

In US 2008/0291999 A1 it is stated that the SEI NAL unit may itself be encrypted and/or signed (validated) so that information contained in it is not easily accessible to an unauthorized user. This could possibly be understood as either: 1) the entire SEI may be encrypted and/or signed; or 2) the information contained in the SEI may be encrypted and/or signed.

If the statement is to be understood as the entire SEI may be encrypted and/or signed, US 2008/0291999 A1 neither explains how the encryption and/or signing (validation) of the SEI is accomplished so that information contained in it is not easily accessible nor where to store or how to transmit the SEI decryption data and/or the SEI validation data needed for decrypting and/or validating the encrypted and/or signed SEI. Further, if the entire SEI were to be encrypted, a recipient of such an encrypted SEI would not be able to recognise it as an SEI as it is encrypted. Furthermore, the recipient would not be able to ignore the encrypted SEI and process the next NAL unit in the sequence, as the recipient would not have knowledge about the length of the encrypted SEI. Thus, the statement cannot be understood as that the entire SEI is encrypted or signed.

Therefore, the statement should be understood as the information contained in the SEI may be encrypted and/or signed. The information contained in the SEI is understood as the SEI data and thus it seems as the SEI data may be encrypted and/or signed (validated). If the SEI data is encrypted and/or signed in analogy with the encryption and signing of the video frame it is assumed that the SEI may include the decryption data and/or validation data needed to decrypt and validate the encrypted and/or signed SEI data in the payload. FIG. 3 schematically illustrates an SEI according to prior art. The prior art SEI consists of a header, information about a payload size, a universally unique identifier (UUID), a payload, e.g., SEI data, and a stop bit indicating an end of the SEI. Alternatively, it is assumed that the decryption data and/or validation data is transmitted to the recipient over another transmission channel. Thus, it is assumed that the payload of the SEI disclosed in US 2008/0291999 A1 in addition to the encrypted and/or signed SEI data may comprise also the decryption data and/or validation data needed to decrypt and/or validate the encrypted and/or signed SEI data, or that such decryption data and/or validation data is sent of another transmission channel.

A security risk arises from such a solution wherein only a part of the payload, i.e., the SEI data, is encrypted and/or signed in that it would be possible to tamper with other parts of the SEI, such as increasing the payload size, thereby making it possible to introduce additional data in the SEI without this getting noticed when encrypting and/or validating using the signed SEI data and the encryption data and/or the validation data.

The examples illustrate the shortcomings of available methods for signing, e.g., digitally signing, an encoded video sequence.

SUMMARY

One objective of the present disclosure is to make available methods and devices for signing, e.g., digitally signing, an encoded video sequence with a mechanism protecting against unauthorized replacement, removal or insertion of video frames. A further objective is to provide a mechanism to detect an occurrence of a manipulation of the encoded video sequence.

These and other objectives are achieved by the present disclosure as defined by the independent claims.

In a first aspect of the disclosure, there is provided a method of signing an encoded video sequence. The method comprises: obtaining an encoded video sequence composed of encoded image frames; generating a set of one or more frame fingerprints for each encoded image frame; generating a document comprising a header of a supplemental information unit and a representation of the generated sets of one or more frame fingerprints; generating a document signature by digitally signing the document; generating the supplemental information unit to only consist of the document, the document signature and an indication of an end of the supplemental information unit; and signing the encoded video sequence by associating the generated supplemental information unit with the encoded video sequence.

In this disclosure, the term "fingerprint" should be understood as a unique identifier of a data item. The fingerprint of the data item may be obtained by hashing, i.e., by performing a hashing operation on, the data item or a subset thereof. Alternatively, the fingerprint may be obtained by performing a different operation, such as a checksum operation, on the data item or a subset thereof. Yet an alternative to obtain the fingerprint of the data item is to digitally sign the data item or a subset thereof. The data item may be image data which encodes a video frame or a part of the image data. Possibly, the data item may be combined with other data, such as a cryptographic salt or a timestamp.

Further, the term "frame fingerprint" should in this disclosure be understood as a fingerprint of a frame, e.g., of an encoded image frame. As an encoded image frame may be composed of a plurality of units, e.g., Network Abstraction Layer (NAL) units in the H.26x encoding format or Open Bitstream Units (OBUs) in the AV1 encoding format, a frame fingerprint may be generated for each of the plurality of units, and thus, a set of one or more such frame fingerprints may be generated for each encoded image frame.

Each NAL unit consists of a header specifying the type of the NAL unit, e.g., if the NAL unit relates to an encoded image frame such as an intra-frame or inter-frame, or if it relates to a supplementation information unit. In addition to the header, each NAL unit comprises a payload. Each OBU has a header that provides identifying information for the data (payload) contained in the OBU (AV1 Bitstream & Decoding Process Specification, https://aomediacodec.github.io/av1-spec/av1-spec.pdf).

In this disclosure the term "document" should be understood as a text file or another data structure, such as a bytestream or bitstream. The term "document signature" refers to a digital signature for the document, and by means of which document signature the document's authenticity can be validated. Furthermore, the term "supplemental information unit (SIU)" should in this disclosure be understood as a unit or message configured to comprise supplemental information about or relating to the encoded video sequence. The supplemental information unit may for example be a Supplemental Enhancement Information (SEI) message in the H.26x encoding format, or Metadata Open Bitstream Unit (OBU) in the AV1 encoding format. The header of the supplemental information unit comprises supplemental data, such as an indication of the supplemental information unit, i.e., an indication indicating the supplemental information unit as a supplemental information unit. By reading the indication a decoder will know what type of unit it is to decode.

The representation of the generated sets of one or more frame fingerprints may be or comprise a set or a list of frame fingerprints from all the generated sets of one or more frame fingerprints or a set or list of a part of the frame fingerprints from all the generated sets of one or more frame fingerprints. Alternatively, the representation may be or comprise one or more hashes of the frame fingerprints from all generated sets of one or more frame fingerprints or one or more hashes of parts of the frame fingerprints from all generated set of one or more frame fingerprints.

By the expression "signing the encoded video sequence by associating the generated supplemental information unit with the encoded video sequence" it should be understood that the generated supplemental information unit, comprising the document and the document signature, is associated with the encoded video sequence to, sign, e.g., digitally sign, the encoded video sequence. This may also be expressed as the encoded video sequence is provided with a signature thanks to the association of the generated supplemental information unit, comprising the document and the document signature, with the encoded video sequence. A recipient of the signed encoded video sequence and the associated supplemental information unit will use the document and the document signature of the supplemental information unit to validate the encoded video sequence. The document and the document signature may be referred to as a signature for the encoded video sequence. As will be described in this disclosure, the generated supplemental information unit may be associated with the encoded video sequence in different ways. By generating the supplemental information unit to only consist of the document, the document signature and an indication of an end of the supplemental information unit; and by signing the encoded video sequence by associating the generated supplemental information unit with the encoded video sequence, it will not be possible to manipulate the supplemental information unit, e.g., with the document, without detection. The reason being that the document will not be correctly validated by means of the document signature if the document has been modified after the generation of the document signature. For example, if the document and document signature were generated at the device and included in the supplemental information unit associated with the encoded video sequence by the device before transmittal to a recipient, and if the SEI is modified after transmittal but before it reaches the recipient, the recipient will not be able to verify the authenticity of the document using the received document signature. If the authenticity of the document cannot be verified, the recipient will understand that the encoded video sequence has been exposed to an unauthorised activity of some sort and can take necessary actions.

Further details regarding embodiments of the first aspect of the disclosure are given in the detailed description and in the dependent claims.

In a second aspect of the disclosure, there is provided a device arranged to perform the method disclosed herein. Broadly speaking, the second aspect of the disclosure shares the effects and advantages of the first aspect, and it can be implemented with a corresponding degree of technical variation.

A third aspect of the disclosure relates to a computer program containing instructions for causing a computer to carry out the method(s) described in this disclosure. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, in which certain embodiments of the disclosure are shown. These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

In order to achieve the objectives, the present disclosure describes a method and a device for signing an encoded video sequence. Especially, the encoded video sequence is signed by associating the encoded video sequence with a special supplemental information unit, which supplemental information unit is generated to only consist of a document, a document signature and an indication of an end of the supplemental information unit. The supplemental information unit may be a SEI message in the H.26x encoding format, or a Metadata OBU in the AV1 encoding format. Since the supplemental information unit only comprises these three components and no other component(s), it is not possible to manipulate the content of the supplemental information unit, e.g., to change the document, without detection as any tampering will result in an unsuccessful validation of the document. Thus, a recipient of the supplemental information unit will understand that a manipulation of the content of the supplemental information unit has been made. The method and device for signing the encoded video sequence will be described in more detail below.

Figure 5:
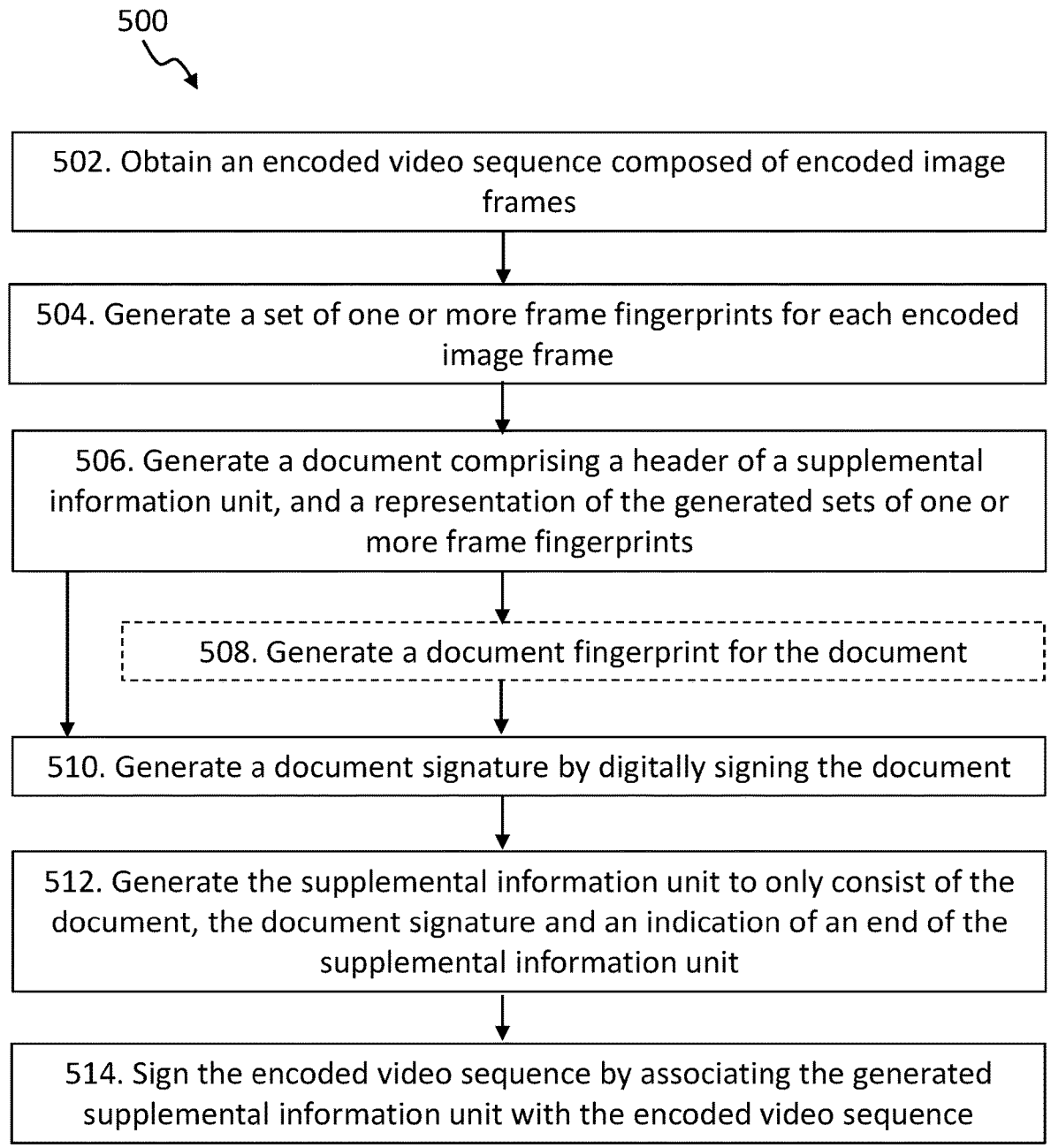
FIG. 5 is a flowchart of a method for signing an encoded video sequence according to embodiments of the disclosure.

With reference to FIG. 5, a method 500 of signing an encoded video sequence will be described. The method 500 may be applied to any encoded video sequence composed of encoded image frames encoded using prediction-based encoding. For example, the encoded image frames may comprise at least one intra-frame and one or more predicted inter-frames. The at least one intra-frame and the one or more predicted inter-frames may be encoded by a video encoding format prescribing temporal video compression. The intra-frame may be an I-frame encoded according to a H.26x compression format, or an intra-frame or key frame encoded according to an AV1 compression format. The predicted inter-frame may be a forward predicted inter-frame, P-frame, or a bidirectional predicted inter-frame, B-frame, encoded according to the H.26x compression formats, or an inter-frame encoded according to the AV1 compression format.

Figure 1:
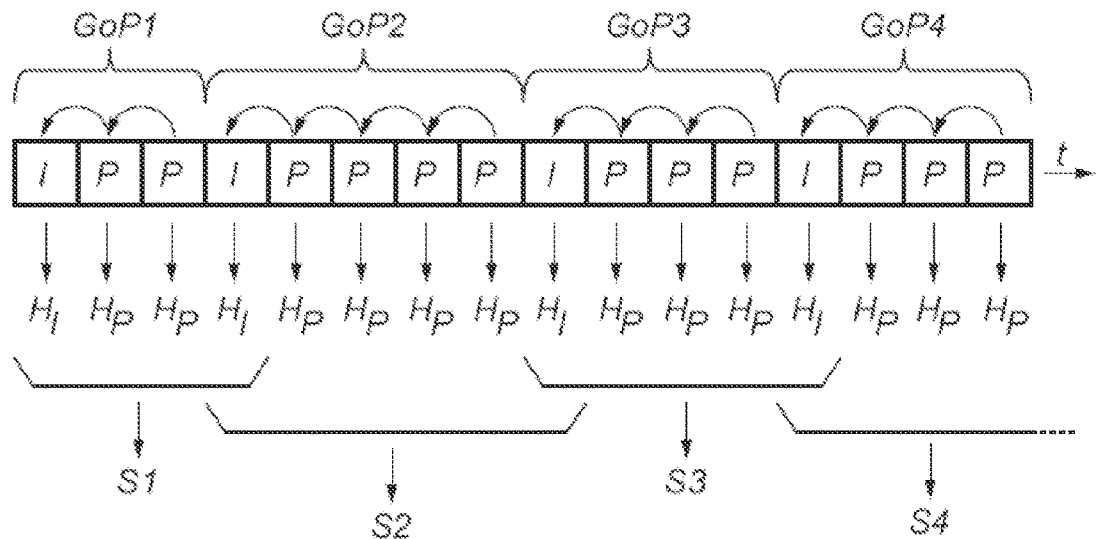
FIG. 1 schematically illustrates a segment of a prediction-based encoded video sequence with accompanying frame-wise fingerprints and signatures generated from these.
Figure 2:
FIG. 2 schematically illustrates a segment of a video sequence wherein each video frame is preceded by an SEI according to prior art.
Figure 3:
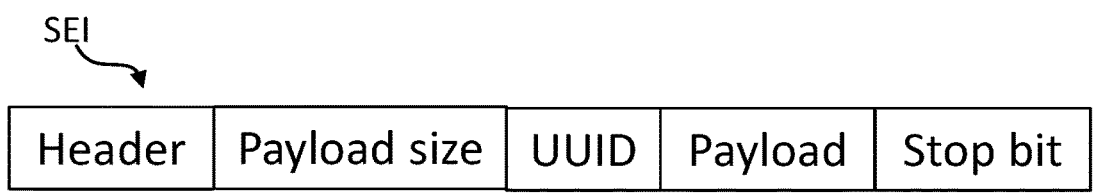
FIG. 3 schematically illustrates an SEI according to prior art.
Figure 4:
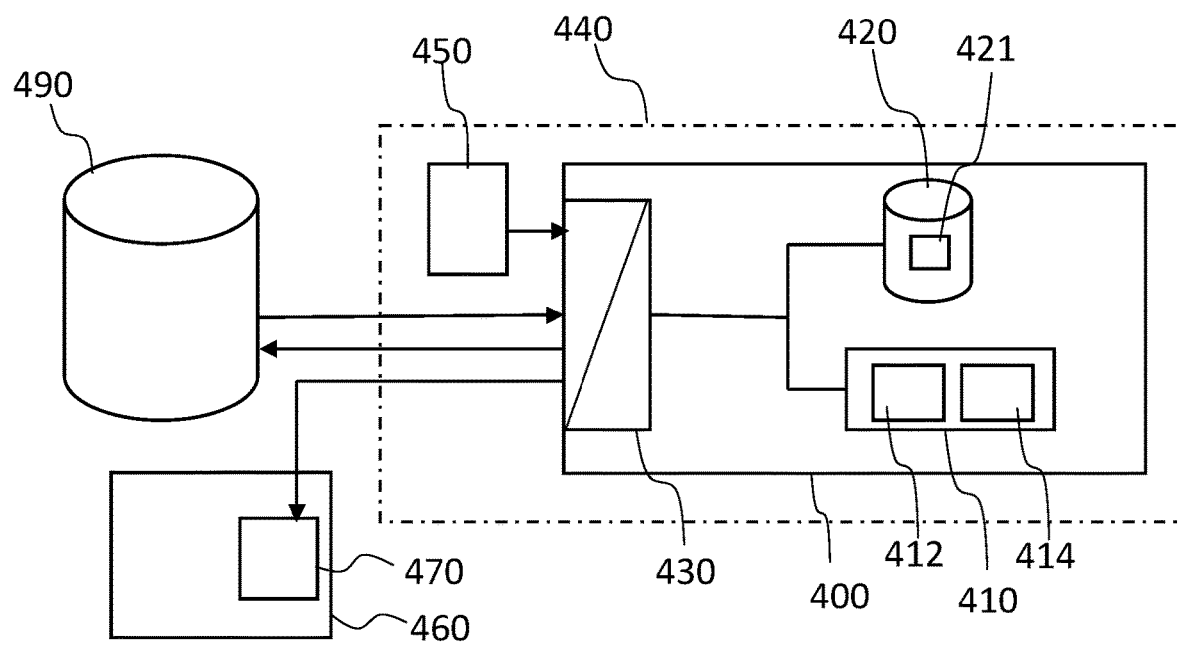
FIG. 4 schematically illustrates a device arranged to perform signing of an encoded video sequence according to embodiments of the disclosure.

The method 500, which signs the encoded video sequence, may be carried out by a suitably arranged generic programmable computer (e.g., with the relevant input and output interfaces) and, in particular, by means of a device 400 as schematically illustrated in FIG. 4. The device 400 comprises processing circuitry 410 arranged to perform actions of the method 500. For example, the processing circuitry 410 may comprise a generating component 412 and a signing component 414 configured to perform actions of the method 500. The device 400 further comprises a memory 420 and an input—output interface 430 which is adapted for bidirectional communication with an external memory 490 which may store, in some embodiments and during some operational phases, the encoded video sequences to be signed. This may be the case in embodiments wherein the device 400 is comprised in a video management system configured to provide signing of stored encoded video sequences as an external service. The device 400 and the external memory 490 may then be owned and operated by different entities or by a common entity. The (internal) memory 420 of the device 400 may be suitable for storage of a program 421 with software instructions for carrying out the method 500, for storage of cryptographic information (e.g., private keys) for generating signatures, as well as logs, configuration files and data supporting various internal housekeeping procedures. The computer program 421 may comprise instructions which, when the program is executed by a computer, cause the computer to carry out actions of the method 500. The device 400 may be provided as a local computer or server, or it may be implemented in a distributed fashion on the basis of networked (cloud) processing resources. In order to provide local signing of encoded video sequences, the device 400 may be integrated in a camera 440, such as a digital video camera, e.g., a monitoring camera adapted for a monitoring application and/or a surveillance application. In some embodiments, wherein the device 400 is comprised in the camera 440, e.g., the camera capturing the video sequence, the device 400 may be arranged in communication with an encoder 450 of the camera 440 and configured to receive the encoded video sequence directly from the encoder 450 and to sign the encoded video sequence before the signed encoded video sequence is transmitted to a recipient, such as a client device 460, comprising a decoder 470, or to the external memory 490 for storage. The client device 460 may be configured to validate and decode the signed encoded video sequence. It should be understood that other arrangements of the device 400 are possible and that the encoder 450 may be an external encoder arranged separately from the camera 440 and the device 400 but arranged in communication with them.

It should be noted that the camera 440 illustrated in FIG. 4 also may include other components relating to, e.g., image capturing and image processing, which are common in conventional camera systems and whose purpose and operations are well known to those having ordinary skill in the art. Such components have been omitted from the illustration and description of FIG. 4 for clarity reasons. The encoded video sequence may be encoded according to a conventional video encoding format. Some common video encoding formats that work with the various embodiments of the present disclosure include: High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples. The H.264, H.265, and H.266 coding formats are sometimes in this disclosure referred to as H.26x coding formats. The terms "coding format" and "compression format" are used interchangeably in this disclosure. The above-mentioned video encoding formats prescribe temporal video compression implemented in terms of intra-image frames and inter-image frames.

Figure 6A:
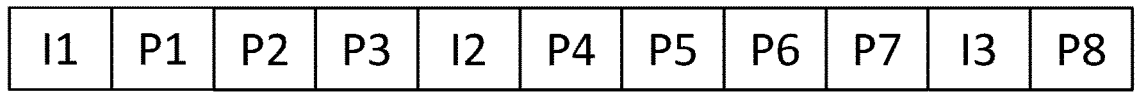
FIGS. 6A-6D schematically illustrates an encoded video sequence, a supplemental information unit, a first example of a document and a second example of a document, respectively.

The method 500 for signing an encoded video sequence starts with action 502, wherein an encoded video sequence composed of encoded image frames of a video sequence is obtained. FIG. 6A schematically illustrates an encoded video sequence comprising three intra-frames denoted I1-I3, and eight inter-frames, denoted P1-P8. The device 400 may be configured to obtain, e.g., retrieve or receive, the encoded video sequence from the external memory 490 or from the encoder 450. Thus, the act of obtaining the encoded video sequence may include gaining access to a memory where the video data is stored (e.g., the external memory 490), downloading the video data, and/or receiving a transmission with the video data.

A set of one or more frame fingerprints for each encoded image frame is generated in action 504. As previously mentioned, a fingerprint is a unique identifier of a data item, and thus a frame fingerprint is a fingerprint for an image frame, especially for an encoded image frame. A specific frame fingerprint may be used by a recipient to verify the authenticity of a specific encoded image frame for which the specific frame fingerprint was generated.

The frame fingerprint for the encoded image frame may be obtained by hashing, i.e., by performing a hashing operation on the encoded image frame or a part thereof. A cryptographic salt may be added to the data on which the hashing operation is to be performed, whereby the number of hash operations needed may be reduced. An alternative to the hashing operation is to obtain the fingerprint by performing a different operation, such as a checksum operation, on the encoded image frame or a part thereof. Yet an alternative to obtain the fingerprint for the encoded image frame is to digitally sign the encoded image frame or a part thereof.

As an encoded image frame may be composed of a plurality of units, such as NAL units or OBUs, a frame fingerprint may be generated for each such unit resulting in that a set of a plurality of frame fingerprints is generated for each encoded image frame. However, it should be understood that even if the encoded image frame is composed of several units, several frame fingerprints do not have to be generated for that encoded image frame, but the set of generated frame fingerprints for an encoded image frame may comprise only one frame fingerprint. The device 400 is configured to generate the set of one or more frame fingerprints, e.g., by means of the generating component 412 of the processing circuitry 410.

In embodiments where the encoded video sequence comprises at least one intra-frame and one or more predicted inter-frames, the representation of the generated sets of the one or more frame fingerprints comprises a generated fingerprint ($H_I$) of the at least one intra-frame, and a generated fingerprint ($H_P$) of each predicted inter-frame of the one or more predicted inter-frames.

The respective fingerprints $H_I$, $H_P$ of the intra-frame and the predicted inter-frame can be generated using a same or two different hash functions. In one embodiment, the fingerprint $H_I$ of the intra-frame is generated using a relatively safer hash function (e.g., 1024 bits) and the fingerprint $H_P$ of the predicted inter-frame is generated using a relatively simpler hash function (e.g., 256 bits) which has a lower computational cost. If the fingerprint $H_P$ of the predicted inter-frame is dependent on the fingerprint of the intra-frame, it can be generated in a computationally lean manner using a simpler hash function without lowering the overall safety level significantly.

The encoded video sequence may comprise a first group of pictures and a second group of pictures. In such embodiments, the method may comprise a sub-action of identifying the first and second groups of pictures. Further, the generated sets of the one or more frame fingerprints may comprise a generated fingerprint ($H_I$) of an intra-frame of the first group of pictures, a generated fingerprint ($H_P$) of each predicted inter-frame of the first group of pictures, and a generated fingerprint ($H_I$) of an intra-frame of the second group of pictures.

The generated fingerprint ($H_P$) of each predicted inter-frame may be generated by hashing a combination of data derived from the predicted inter-frame and data derived from an intra-frame to which the predicted inter-frame refers directly or indirectly. The fingerprint of the predicted inter-frame may be independent of any further predicted inter-frame to which the predicted inter-frame refers directly or indirectly. Further, the data derived from the predicted inter-frame includes one out of the predicted inter-frame's image data and the generated first fingerprint of the predicted inter-frame's image data. Furthermore, the data derived from the intra-frame is the generated first fingerprint of the intra-frame.

The fingerprint computation may be expressed as:

$$H_P = h(\{\lambda, \pi\}),$$

where h is a hash function, $\lambda$ is the data derived from the intra-frame and $\pi$ is the data derived from the inter-frame. The hash function (or one-way function) may be a cryptographic hash function that provides a safety level considered adequate in view of the sensitivity of the video data to be signed and/or in view of the value at stake if the video data is manipulated by an unauthorized party. Three examples are SHA-256, SHA3-512 and RSA-1024. The hash function shall be predefined (e.g., it shall be reproducible) so that the fingerprints can be regenerated when the fingerprint is to be verified. The curly brackets notation {.} refers to a generic data combination operation, which may include concatenating the data linearly (juxtaposition) or in various staggered arrangements. The combination operation may further include an arithmetic operation on the data, such as bitwise OR, XOR, multiplication, division or a modulo operation.

A further development handles the case where an inter-frame refers directly or indirectly to two intra-frames. The fingerprint of the inter-frame is then generated based on a combination of data $\lambda_1$, $\lambda_2$ derived from both of these intra-frames, in addition to the data $\pi$ derived from the inter-frame itself:

$$H_P = h(\lambda_1, \lambda_2, \pi).$$

Figure 6B:
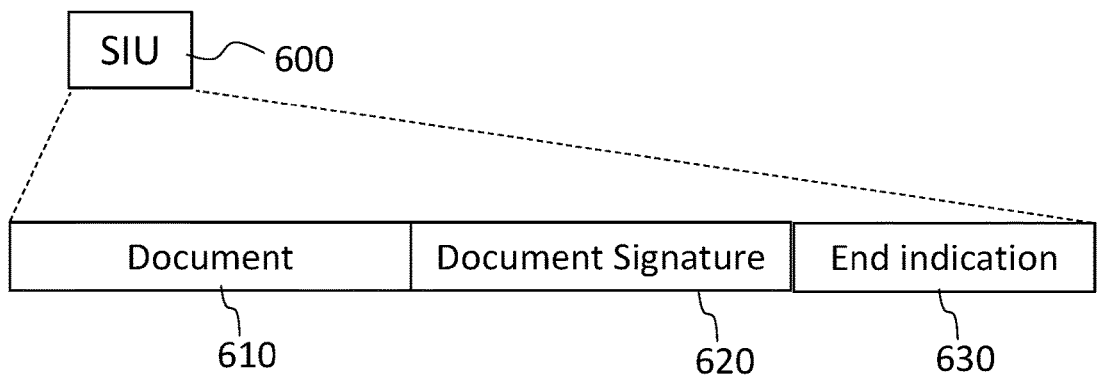
Figure 6C:
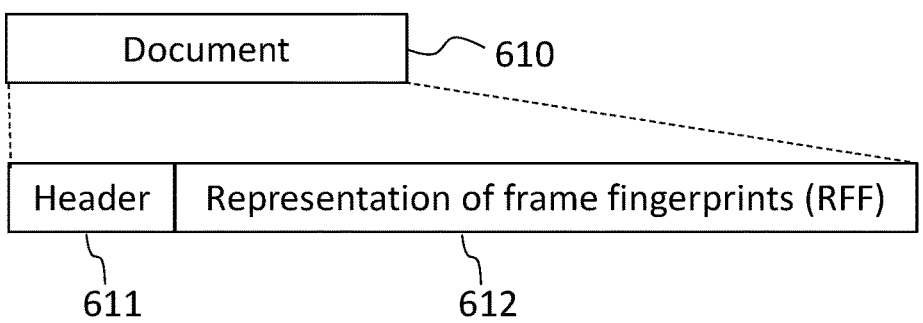

In action 506 a document comprising a header of a supplemental information unit and a representation of the generated sets of one or more frame fingerprints is generated. A document 610 is schematically illustrated in FIG. 6C to comprise a header 611 and a representation of frame fingerprints 612. The representation of the frame fingerprints 612 may be referred to as the payload of the document 610 illustrated in FIG. 6C. As previously mentioned, the document may be a text file or another data structure, and the supplemental information unit may be a unit or message comprising supplemental information. The header of the supplemental information unit comprises supplemental data, such as an indication of the supplemental information unit to indicate that it is a supplemental information unit. As will be described below, the supplementation information unit is generated in action 512. Thus, it should be noted that in action 506 the supplemental information unit is not yet generated, but it is still possible in action 506 to have knowledge about the header of the supplemental information unit, i.e., about the header of the to be generated supplementation information unit. For example, in action 506 the device 400 may set the header to comprise the indication of the supplemental information unit. As previously mentioned, it should be understood that the indication of the supplemental information unit indicates the supplemental information unit as a supplemental information unit and is the same for all supplemental information units. Further, and as also previously mentioned, the representation of the generated sets of one or more frame fingerprints may be or comprise a set or a list of frame fingerprints from all the generated sets of one or more frame fingerprints or from a part thereof. Alternatively, the representation may be or comprise one or more hashes of the frame fingerprints from all generated sets of one or more frame fingerprints or from a part thereof. Alternatively, the representation may be a combination of frame fingerprints and hashes of the frame fingerprints. The device 400 is configured to generate the document, e.g., by means of the generation component of the processing circuitry 410.

Figure 6D:
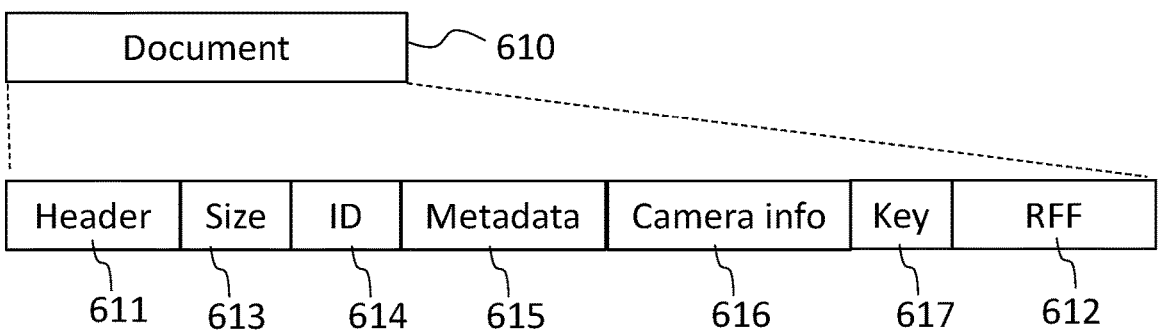

In some embodiments, the document comprises further information in addition to the header and the representation mentioned above. In such embodiments, the document may comprise one or more out of: a payload size value for a payload comprised in the supplemental information unit, an identifier of the payload, metadata relating to the encoded video sequence, camera information relating to a camera capturing the video sequence, and a public key of an asymmetric cryptographic key pair. The identifier may identify the type of payload comprised in the document. For example, the identifier may identify or indicate that the payload relates to a signed encoded video sequence. Further, the identifier may be a unique identifier, such as a universally unique identifier (UUID). An example of a document 610 comprising all of the further information mentioned above in addition to the header 611 and the representation 612 is illustrated in FIG. 6D. As illustrated such a document 610 comprises the header 611, the representation 612, a payload size value 613, an identifier ID 614, metadata 615 relating to the encoded video sequence, camera information 616 and a public key 617. The identifier ID 614 is an identifier of the payload comprised in the supplemental information unit and may be a UUID. The metadata 615 may comprise information describing, e.g., how to interpret, or the syntax of, the camera information 616 and/or the representation of frame fingerprints 612. In some embodiments, the representation 612, the metadata 615, the camera information 616 and/or the public key 617 are comprised in a sub-document. The sub-document, possibly also including the identifier ID 614, may be referred to as payload of the document 610 illustrated in FIG. 6D. As the document, the sub-document may be a text file or another data structure. In such embodiments, the document 610 may comprise the header 611, the payload size value 613, the identifier 614 and the sub-document.

In some embodiments, a document fingerprint for the document is generated in action 508. The document fingerprint is a fingerprint for the document. The document fingerprint may be obtained by hashing, i.e., by performing a hashing operation, on the document, i.e., on the content of the document, or on a part thereof. Alternatively, the fingerprint may be obtained by performing a different operation, such as a checksum operation, on the document or a part thereof. Yet an alternative to obtain the fingerprint of the document is to digitally sign the document or a part thereof. The processing circuitry 410 may be configured, e.g., by means of the generation component 412, to generate the document fingerprint.

In action 510 a document signature is generated by digitally signing the document. In some embodiments comprising the generation of the document fingerprint as described above in action 508, the document signature generated in action 510 is generated by digitally signing the document fingerprint. The document signature may be referred to as a signature of the encoded video sequence or of a segment of the encoded video sequence. The segment of the encoded video sequence may be a group of pictures. The document signature may for example be generated by asymmetric cryptography, i.e., using a private key from a key pair in which the public key has been pre-shared with the recipient such that the recipient is able to verify the signature. The device 400 is configured to generate the document signature, e.g., by means of the generation component 412 of the processing circuitry 410.

In action 512 the supplemental information unit is generated to only consist of the document, the document signature and an indication of an end of the supplemental information unit. The supplemental information unit is of the same type of unit as the plurality of units constituting the encoded image frames. That is, the supplementation information unit is a NAL unit in the H.26x encoding formats and an OBU in the AV1 coding format. FIG. 6B illustrates a generated supplemental information unit 600 that consists of a document 610, a document signature 620 and an indication 630 of an end of the supplemental information unit 600. The indication of the end of the supplemental information unit may be an explicit indication, such as a stop bit, or it may be an implicit indication, such as reaching a predetermined number of bits in the supplemental information unit. It should be understood that the document, the document signature and the indication of an end of the supplemental information unit are the only components of the supplemental information unit. Thereby is achieved that any tampering with the content of the supplemental information unit will be detected, as the tampering will result in an unsuccessful validation of the document's authenticity. Thus, a recipient of the supplemental information unit will understand that a manipulation of the content of the supplemental information unit has been made. The device 400 is configured to generate the supplemental information unit, e.g., by means of the generation component 412 of the processing circuitry 410.

As previously mentioned, the supplemental information unit may be an SEI message of the H.26x encoding formats or a metadata OBU of the AV1 encoding format. Usually, an SEI contains information that is not necessary to decode encoded image frames. However, the supplemental information unit according to the present disclosure is needed to validate the authenticity of the encoded image frames. As previously described, the supplemental information unit is generated to consist of the document, the document signature and the indication of the end. As the document comprises the representation of the generated sets of one or more frame fingerprints, the document is needed to validate the encoded image frames. If it is not possible to use the document signature to validate the document due to a manipulation of the document's content, it may not be possible to validate the authenticity of the encoded image frames. Thus, when one single supplemental information unit is generated for the entire encoded video sequence, the document comprises the representation of the generated sets of one or more frame fingerprints for the entire encoded video sequence, and thus the document is needed to validate the authenticity of the encoded image frames. If it is not possible to use the document signature to validate the document due to a manipulation of the document's content, it may not be possible to validate the authenticity of the encoded image frames. In correspondence, when one supplemental information unit is generated for each group of pictures, each supplemental information unit's document needs to be successfully verified in order to be able to validate the authenticity of the encoded image frames of that group of pictures.

The encoded video sequence is signed in action 514 by associating the generated supplemental information unit with the encoded video sequence. The device 400 is configured to sign the encoded video sequence, e.g., by means of the signing component 414 of the processing circuitry 410. In order to sign the encoded video sequence, the generated supplemental information unit may be associated with the encoded video sequence in different ways, some of which will be described below.

In some embodiments, the generated supplemental information unit is associated with the encoded video sequence by a reference to the encoded video sequence and transmitted on a channel different from a channel transmitting the encoded video sequence. The generated supplemental information unit and the encoded video sequence may be associated with each other by means of timestamps. For example, if a generated supplemental information unit and an encoded video sequence have the same or corresponding timestamps, they are considered as being associated with each other. Thus, the generated supplemental information unit may sign the encoded video sequences even if it is not transmitted together with the encoded video sequence as long as a recipient is able to receive both the generated supplemental information and the encoded video sequence and to validate the signature. The channel transmitting the (smaller) supplemental information unit may be a first communication channel, such as a safe communication path, and the channel transmitting the (larger) encoded video sequence may be a second communication channel, such as an arbitrary communication path. Alternatively, the generated supplemental information unit is associated with the encoded video sequence by an association between the encoded video sequence and the supplemental information unit outside the data format, e.g., by forming a data structure (container) which includes both the encoded video sequence and the supplemental information unit and in which the encoded video sequence will be transmitted to the intended recipient. These alternatives are advantageous in that they do not require the power to modify the encoded video sequence (e.g., an authorization granted by the video data owner), and they can thus be executed by an entity without write access rights to the encoded video sequence.

Figure 7A:
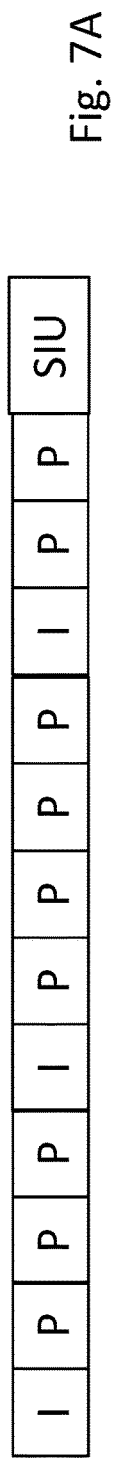
FIGS. 7A-7E schematically illustrate embodiments of a signed encoded video sequence.

In some alternative embodiments, the generated supplemental information unit is associated with the encoded video sequence by adding the generated supplemental information at an end of the encoded video sequence. This is schematically illustrated in FIG. 7A, wherein the supplemental information unit SIU is added at an end of the encoded video sequence IPPPIPPPPIPP.

Sometimes the encoded video sequence comprises several groups of pictures. In such embodiments, the signature of the encoded video sequence may be said to consist of multiple sub-signatures, i.e., of multiple supplemental information units, which are provided for different segments of the encoded video sequence. This allows continuous signature verification during playback. It also supports the signing of video data encoding a live video stream, which is particularly useful in video monitoring applications.

For example, the encoded video sequence may comprise a first part of encoded image frames associated with a first group of pictures, and a second, directly subsequent, part of encoded image frames associated with a second group of pictures. For such an encoded video sequence, a supplementation information unit may be generated for each group. Thus, a generated supplemental information unit may be generated for the first part of encoded image frames. Further, the generated supplemental information unit may be associated with the encoded video sequence by adding the generated supplemental information unit subsequent to the first group of pictures associated with the first part of encoded image frames. Even if reference is made to a group of pictures in this disclosure it should be understood that other terms may be used such as a group of frames, a frame group, a set of pictures and a set of frames. The first and second groups of pictures may in some encoding formats be referred to as a first GOP and a second GOP. This is schematically illustrated in for example FIGS. 7B, 7C, 7D and 7E wherein the supplementation information unit SIU1 generated for the first part of encoded image frames associated with a first group of pictures GOP1 is associated with the encoded video sequence by adding it after the first group of pictures GOP1. The same is true for a supplemental information unit SIU0, SIU2, and SIU3 generated for groups of pictures GOP0 (not shown), GOP2 and GOP3, respectively.

Figure 7B:
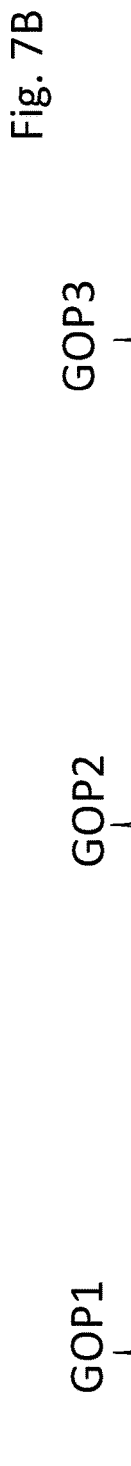

In addition to be added subsequent to the first group of pictures as mentioned above, the generated supplemental information unit may be associated with the encoded video sequence by adding it to the encoded video sequence before the second group of pictures associated with the second part of encoded image frames. Thus, the supplemental information unit may be added after the first group of pictures but before the second group of pictures. In other words, the generated supplemental information unit may be added between the first group of pictures and the second group of pictures of the encoded video sequence. This may also be expressed as the supplemental information unit is inserted in the encoded video sequence after the first group of pictures, e.g., after the last inter-frame, but before the second group of pictures, e.g., before a subsequent intra-frame. This is schematically illustrated in FIG. 7B, wherein the supplemental information unit SIU1 is added between the group of pictures GOP1 and GOP2. The same is true for the supplemental information unit SIU2 being added between the groups of pictures GOP2 and GOP3.

Figure 7C:
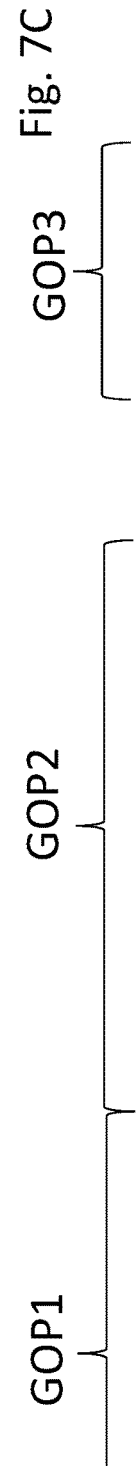
Figure 7D:
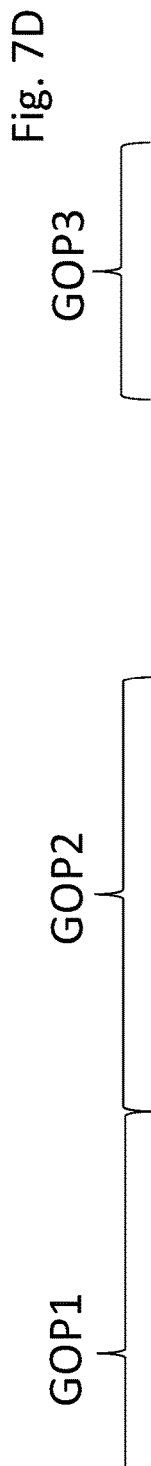
Figure 7E:

Alternatively, and in addition to be added subsequent to the first group of pictures as mentioned above, the generated supplemental information unit may be associated with the encoded video sequence by adding the generated supplemental information to the encoded video sequence as part of the second group of pictures associated with the second part of encoded image frames. Thus, the supplemental information unit may be included in the second group of pictures. This is schematically illustrated in FIGS. 7C and 7D, wherein the supplemental information unit SIU1 is comprised in the group of pictures GOP2.

As the supplemental information unit is of the same type as the units constituting the encoded image frames it is possible to add the supplemental information unit to the encoded video sequence at the desired location, e.g., sequential order, in the encoded video sequence without needing a special decoder at the recipient's side to decode the encoded video sequence.

A recipient in possession of the encoded video sequence which has been signed in the above-described manner can validate its authenticity by the following procedure:

1. attempt to verify the document signature comprised in the supplemental information unit by using the public key of the private key by which the sender generated the document signature. Thus, the content of the received document can be validated as being correct when the received document signature is successfully verified using the public key and the received document. For example, the content of the received document is validated as being correct when the received document signature is successfully verified using the public key and the hash of the received document;
2. if the document signature is successfully verified and the document thereby is proven to be correct, e.g., unmanipulated, attempting to verify the fingerprints comprised in the document;
3. if all fingerprints in the document are successfully verified, concluding that the encoded video sequence associated with the supplemental information unit is authentic (validation).

Typically, the verification in step 2 includes replicating a fingerprinting operation deemed to have been performed by the sender, i.e., recomputing the fingerprints. The verification in step 1, for its part, typically relates to an asymmetric signature setup, where signing and verification are distinct cryptographic operations corresponding to private/public keys. Other combinations of symmetric and/or asymmetric verification operations are possible without departing from the scope of the disclosure.

The document signature described herein is a digital signature. In some embodiments, the document signature works by proving that a digital message or document was not modified—intentionally or unintentionally—from the time it was signed. The document signature does this by generating a unique hash of the message or document and encrypting it using the sender's private key. The hash generated is unique to the message or document and changing any part of it will completely change the hash. Once completed, the message or digital document is digitally signed and sent to the recipient. The recipient then generates their own hash of the message or digital document and decrypts the sender's hash (included in the original message) using the sender's public key. The recipient compares the hash they generate against the sender's decrypted hash; if they match, the message or digital document has not been modified and the sender is authenticated.

The aspects of the present disclosure have mainly been described above with reference to a few embodiments.

However, as is readily appreciated by a person skilled in the art, other embodiments than the ones disclosed above are equally possible within the scope of the disclosure, as defined by the appended patent claims.

The invention claimed is:

1. A method comprising:
obtaining an encoded video sequence composed of encoded image frames;
generating a set of one or more frame fingerprints for each encoded image frame, wherein a frame fingerprint is a unique identifier of an encoded image frame, and wherein the frame fingerprint is obtained by:
performing a hashing operation or a checksum operation on the encoded image frame or a subset thereof, or
digitally signing the encoded image frame or a subset thereof with asymmetric cryptography;
generating a document comprising a header of a supplemental information unit, and a representation of the generated sets of one or more frame fingerprints;
generating a document signature by digitally signing the document, wherein the document signature is a digital signature for the document and the digital signature is generated by applying asymmetric cryptography to the document;
generating the supplemental information unit to only consist of the document, the document signature and an indication of an end of the supplemental information unit; and
providing the encoded video sequence with a signature by associating the generated supplemental information unit with the encoded video sequence.

2. The method of claim 1, further comprising:
generating a document fingerprint for the document; and wherein the generating of the document signature for the document comprises:
generating the document signature by digitally signing the document fingerprint.

3. The method of claim 1, wherein the document further comprises one or more out of: a payload size value for a payload comprised in the supplemental information unit, an identifier of the payload, metadata relating to the encoded video sequence, camera information relating to a camera capturing the video sequence, and a public key of an asymmetric cryptographic key pair.

4. The method of claim 1, wherein the generated supplemental information unit is associated with the encoded video sequence by a reference to the encoded video sequence and transmitted on a channel different from a channel transmitting the encoded video sequence.

5. The method of claim 1, wherein the generated supplemental information unit is associated with the encoded video sequence by adding the generated supplemental information at an end of the encoded video sequence.

6. The method of claim 1, wherein the encoded video sequence comprises a first part of encoded image frames associated with a first group of pictures, and a second, directly subsequent, part of encoded image frames associated with a second group of pictures, wherein the generated supplemental information unit is generated for the first part of encoded image frames and wherein the generated supplemental information unit is associated with the encoded video sequence by adding the generated supplemental information unit subsequent to the first group of pictures associated with the first part of encoded image frames.

7. The method of claim 6, wherein the generated supplemental information unit is associated with the encoded video sequence by adding the generated supplemental information to the encoded video sequence before the second group of pictures associated with the second part of encoded image frames.

8. The method of claim 6, wherein the generated supplemental information unit is associated with the encoded video sequence by adding the generated supplemental information to the encoded video sequence as part of the second group of pictures associated with the second part of encoded image frames.

9. The method of claim 1, wherein the encoded image frames comprise at least one intra-frame and one or more predicted inter-frames, wherein the at least one intra-frame and the one or more predicted inter-frames are encoded by a video encoding format prescribing temporal video compression.

10. The method of claim 9, wherein the representation of the generated sets of one or more frame fingerprints comprises a generated fingerprint ($H_I$) of the at least one intra-frame, and a generated fingerprint ($H_P$) of each predicted inter-frame of the one or more predicted inter-frames.

11. The method of claim 6, wherein the representation of the generated sets of the one or more frame fingerprints comprises a generated fingerprint ($H_I$) of an intra-frame of the first group of pictures, a generated fingerprint ($H_P$) of each predicted inter-frame of the first group of pictures, and a generated fingerprint ($H_I$) of an intra-frame of the second group of pictures.

12. The method of claim 10, wherein the generated fingerprint ($H_P$) of each predicted inter-frame is generated by hashing a combination of data derived from the predicted inter-frame and data derived from an intra-frame to which the predicted inter-frame refers directly or indirectly, wherein the fingerprint of the predicted inter-frame is independent of any further predicted inter-frame to which the predicted inter-frame refers directly or indirectly, wherein the data derived from the predicted inter-frame includes one out of the predicted inter-frame's image data and a generated first fingerprint of the predicted inter-frame's image data, and wherein the data derived from the intra-frame is a generated first fingerprint of the intra-frame.

13. The method of claim 9, wherein the intra-frame is an I-frame encoded according to a H.26x compression format, or an intra-frame or key frame encoded according to an AOMedia Video 1, AV1, compression format, and wherein the predicted inter-frame is a forward predicted inter-frame, P-frame, or a bidirectional predicted inter-frame, B-frame, encoded according to the H.26x compression format, or an inter-frame encoded according to the AV1 compression format.

14. A device, comprising:
an imaging device capturing a video sequence;
an encoder for encoding the video sequence, and outputting an encoded video sequence comprising encoded image frames;
a processor for:
generating a set of one or more frame fingerprints for each encoded image frame, wherein a frame fingerprint is a unique identifier of an encoded image frame, and wherein the frame fingerprint is obtained by:
performing a hashing operation or a checksum operation on the encoded image frame or a subset thereof, or digitally signing the encoded image frame or a subset thereof with asymmetric cryptography:

generating a document comprising a header of a supplemental information unit, and a representation of the generated sets of one or more frame fingerprints;

generating a document signature by digitally signing the document, wherein the document signature is a digital signature for the document, and the digital signature is generated by applying asymmetric cryptography to the document;

generating the supplemental information unit to only consist of the document, the document signature and an indication of an end of the supplemental information unit; and providing the encoded video sequence with a signature by associating the generated supplemental information unit with the encoded video sequence; and a transmitter for transmitting the encoded video sequence with the signature.

15. A non-transitory computer-readable storage medium having stored thereon a computer program comprising instructions which, when the program is executed by a computer, cause the computer to carry out a method, the method comprising:

obtaining an encoded video sequence composed of encoded image frames;

generating a set of one or more frame fingerprints for each encoded image frame, wherein a frame fingerprint is a unique identifier of an encoded image frame, and wherein the frame fingerprint is obtained by:

performing a hashing operation or a checksum operation on the encoded image frame or a subset thereof, or digitally signing the encoded image frame or a subset thereof with asymmetric cryptography;

generating a document comprising a header of a supplemental information unit, and a representation of the generated sets of one or more frame fingerprints;

generating a document signature by digitally signing the document, wherein the document signature is a digital signature for the document and the digital signature is generated by applying asymmetric cryptography to the document;

generating the supplemental information unit to only consist of the document, the document signature and an indication of an end of the supplemental information unit; and providing the encoded video sequence with a signature by associating the generated supplemental information unit with the encoded video sequence.

* * * * *